United States Patent
Mizuguchi et al.

(10) Patent No.: US 8,504,356 B2
(45) Date of Patent: Aug. 6, 2013

(54) WORD CLASSIFICATION SYSTEM, METHOD, AND PROGRAM

(75) Inventors: Hironori Mizuguchi, Tokyo (JP); Masaaki Tsuchida, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 339 days.

(21) Appl. No.: 12/920,920

(22) PCT Filed: Apr. 2, 2009

(86) PCT No.: PCT/JP2009/056900
§ 371 (c)(1),
(2), (4) Date: Sep. 3, 2010

(87) PCT Pub. No.: WO2009/123288
PCT Pub. Date: Oct. 8, 2009

(65) Prior Publication Data
US 2011/0029303 A1    Feb. 3, 2011

(30) Foreign Application Priority Data
Apr. 3, 2008  (JP) ................................. 2008-097520

(51) Int. Cl.
*G06F 17/27* (2006.01)
*G06F 17/28* (2006.01)
*G06F 17/20* (2006.01)
*G10L 21/00* (2013.01)

(52) U.S. Cl.
USPC ........................ 704/9; 704/4; 704/8; 704/277

(58) Field of Classification Search
None
See application file for complete search history.

(56) References Cited

U.S. PATENT DOCUMENTS

| | | | |
|---|---|---|---|
| 6,311,152 B1 * | 10/2001 | Bai et al. ............................ | 704/9 |
| 7,299,180 B2 * | 11/2007 | Wang et al. .................... | 704/257 |
| 8,280,719 B2 * | 10/2012 | Miller ............................... | 704/9 |
| 2007/0233656 A1 * | 10/2007 | Bunescu et al. ................... | 707/3 |
| 2008/0052262 A1 * | 2/2008 | Kosinov et al. .................... | 707/1 |
| 2009/0326923 A1 * | 12/2009 | Yan et al. ........................... | 704/9 |
| 2011/0246076 A1 * | 10/2011 | Su et al. .......................... | 702/19 |

FOREIGN PATENT DOCUMENTS

| | | |
|---|---|---|
| JP | 8-147307 A | 6/1996 |
| JP | 2004334766 A | 11/2004 |
| JP | 2007004458 A | 1/2007 |

OTHER PUBLICATIONS

Shen et al., "Multi-Criteria-based Active Learning for Named Entity Recognition", In ACL '04: Proceedings of the 42nd Annual Meeting on Association for Computational Linguistics, (2004).*

Mayfield et al., "Named Entity Recognition Using Hundreds of Thousands of Features", In Proceedings of the seventh conference on Natural language learning at HLT-NAACL 2003—vol. 4 (2003), pp. 184-187.*

(Continued)

*Primary Examiner* — Brian Albertalli

(57) ABSTRACT

A word classification system is provided with an inter-word pattern learning section for learning at least either the context information or the layout information between classification-known words which co-appear and creating an inter-word pattern for determining whether data relating to a word pair which is a combination of words is data relating to a same-classification word pair which is the combination of words in the same classification or data relating to a different-classification word pair which is a combination of words in different classifications on the basis of the relationship between the classification-known words which co-appear in a document.

30 Claims, 6 Drawing Sheets

OTHER PUBLICATIONS

Isozaki et al., "Efficient Support Vector Classifiers for Named Entity Recognition", In Proceedings of the 19th International Conference on Computational Linguistics (COLING'02) (2002).*

Kudo et al., "Chunking with Support Vector Machines", NAACL '01 Proceedings of the second meeting of the North American Chapter of the Association for Computational Linguistics on Language technologies, (2001).*

International Search Report for PCT/JP2009/056900 mailed Jul. 14, 2009.

H. Yamada et al., "Japanese Named Entity Extraction using Support Vector Machines", Research Report of the Information Processing Society of Japan, Natural Language Process, vol. 2001, No. 20, Mar. 6, 2001, pp. 121-128.

* cited by examiner

FIG. 2

WORDS-OF-KNOWN-CLASSIFICATION DATABASE 1

| CLASSIFICATION A: {a, b, c} |
|---|
| CLASSIFICATION B: {d, e} |
| CLASSIFICATION C: {g, h} |

FIG. 3

DOCUMENTS DATABASE 2 aとbの決定戦きまるのは、…
TIME THAT FINAL MATCH BETWEEN a AND b IS DECIDED … bはdとの和解を発表しました。
AMICABLE SETTLEMENT BETWEEN b AND d WAS ANNOUNCED.

…<td>a</td><td>対(VERSUS)</td><td>b</td><td>5-0</td>… gとhは5位と6位に低迷しており、今後はどのような試合が、…
g AND h ARE IN SLUMP, BEING IN FIFTH RANK AND SIXTH RANK, RESPECTIVELY, AND WHAT KIND OF MATCH IS EXPECTED AFTER THIS, …

LEARNING DATA EXAMPLE 1 OF WORD PAIR a-b

INTER-WORD SURFACE CHARACTER STRING: "と (AND)"
   INTER-WORD PART OF SPEECH: "PARTICLE-COORDINATION"
   INTER-WORD CHARACTER TYPE: HIRAGANA
   INDEPENDENCY: NO
   COORDINATION: YES
   INTER-WORD MORPHOLOGY NUMBER: 1
   EXISTING IN NATURAL SENTENCE: YES
   EQUALLY ARRANGED CROSSWISE: YES
   SIZE OF CHARACTER IS IDENTICAL: YES
   LEFT STRING AND RIGHT STRING ARE IDENTICAL: NO

FIG. 5

LEARNING DATA EXAMPLE 2 OF WORD PAIR a-b

INTER-WORD SURFACE CHARACTER STRING: "</td>", "<td>", "対 (VERSUS)", "</td>", "<td>"
   INTER-WORD PART OF SPEECH: "FINISHING TAG", "STARTING TAG", "NOUN", "FINISHING TAG", "STARTING TAG"
   CHARACTER TYPE: "TAG", "TAG", "KANJI", "TAG", "TAG"
   INDEPENDENCY: NO
   COORDINATION: NO
   INTER-WORD MORPHOLOGY NUMBER: 5
   EXISTING IN NATURAL SENTENCE: NO
   EQUALLY ARRANGED CROSSWISE: YES
   SIZE OF CHARACTER IS IDENTICAL: YES
   LEFT STRING AND RIGHT STRING ARE IDENTICAL: YES

FIG. 7

LEARNING DATA EXAMPLE 3 OF WORD PAIR a-b

INTER-WORD SURFACE CHARACTER STRING: "<td>", "</td>", "と (AND)"
    INTER-WORD PART OF SPEECH: "STARTING TAG", "FINISHING TAG", "PARTICLE-COORDINATION"
    INTER-WORD CHARACTER TYPE: "TAG", "TAG", "HIRAGANA"
    INDEPENDENCY: NO
    COORDINATION: 0.5
    AVERAGE OF INTER-WORD MORPHOLOGY NUMBERS: 3
    NUMBER OF TIMES OF CO-OCCURRENCES: 2
    EXISTING IN NATURAL SENTENCE: 0.5
    EQUALLY ARRANGED CROSSWISE: 1
    SIZE OF CHARACTER IS IDENTICAL: 1
    LEFT STRING AND RIGHT STRING ARE IDENTICAL: 0.5

WORD CLASSIFICATION SYSTEM, METHOD, AND PROGRAM

This application is the National Phase of PCT/JP2009/056900, filed Apr. 2, 2009, which is based upon and claims the benefit of priority from Japanese patent application No. 2008-97520, filed on Apr. 3, 2008, the disclosure of which is incorporated herein in its entirety by reference.

APPLICABLE FIELD IN THE INDUSTRY

The present invention relates to a word classification system, a word classification method, and a word classification program.

BACKGROUND ART

One example of the vocabulary classification technique is described in Non-patent document 1. The word extraction technique, being one of the vocabulary classification techniques, is a technique of classifying words into categories called named entities such as an organization name, a place name, a person's name, and a date. This technique can alleviate a rule preparing work that is done manually by inputting learning data in which the named entities have been, annotated to texts, and learning a word classification rule.

In the Non-patent document 1, the word classification rule is learned based upon context information in an adjacency of an occurrence position for each of individual words. The so-called adjacency signifies two words or so before and after the occurrence position, and the so-called context information is a word, a part of speech, and a character type. The word classification rule is learned on the basis of these pieces of information for each named entity category. That is, as a word classification rule, there exist the word classification rule for determining whether or not the classification is an organization name, the word classification rule for determining whether or not the classification is a place name, and the like. While the word classification rule, which is described as binary data of the learning technique called Support Vector Machines, is not information that a human being can recognize, conceptually, it is thinkable that with regard to the word classification rule of the organization name, the word rules such as "<organization name> holds meetings", "<organization name> develops a system" are learned.

Further, the technology of the word classification related to the present invention is disclosed in Patent document 1. The technology disclosed in Patent document 1 is a technology of, for each category, previously preparing a core word, being a word representative of the above category, a core word dictionary having a plurality of sets of values stored therein indicative of a degree to which the above core word belongs to the above category, and a document database having documents stored therein, retrieving the classification target word from the stored documents of the document database, and furthermore extracting the word having a co-occurrence relation to the above word. And, this technology makes retrieval as to whether each of the extracted co-occurrence relation words is stored as a core word in the core word dictionary, forms a ranking determination value of the category from the values of the retrieved core words, and determines the category to which the classification target word belongs. Herein, the so-called core word is a word that is peculiar to the category, and is representative of the category. For example, with the category [art], there exist [movie], [music], [director], and the like, each of which is a typified word well expressive of [art], and yet a word associated with the above category.

Non-patent document 1: "Japanese Named Entity extraction Using Support Vector Machines" by Hiroyasu Yamada, Taku Kudo, and Yuji Matsumoto, Technical Research Report of the information Processing Society of Japan—Natural Language Process, Vol. 2001, No. 20, pp. 121-128

Patent document 1: JP-P2004-334766A

DISCLOSURE OF THE INVENTION

Problems to be Solved by the Invention

A problematic point of the technology described in the Non-patent document 1 mentioned above is that only a coarse classification can be performed. The reason is that only the context information in the occurrence position of each word is taken as a clue. For example, in the case of trying to classify the professional baseball teams of Japan and the professional baseball teams of US, the classification fails because pieces of the context information in the adjacency of the occurrence locations of respective words, for example, "A team" and "B team" closely resemble each other.

Further, a problematic point of the technology described in the Patent document 1 is that the word that could become a core word needs to be prepared in advance. Thus, this preparation work requires very intensive labors, and it follows that unless the core words are sufficiently prepared, only the coarse classification can be performed.

Thereupon, the present invention has been accomplished in consideration of the above-mentioned problems, and an object thereof is to provide a technology capable of detailedly classifying the words.

Means to Solve the Problem

The present invention for solving the above-mentioned problems is a word classification system including an inter-word pattern learning section for, based upon a relation between words of known classification co-appearing in a document, learning at least either context information or layout information between the words of known classification that co-appear, and creating an inter-word pattern for judging whether data of a word pair, being a set of the words, is data of an identically-classified word pair, being a set of identically-classified words, or data of a differently-classified word pair, being a set of differently-classified words.

The present invention for solving the above-mentioned problems is a word classification system including an inter-word pattern learning section for creating, based upon context information and layout information between identically-classified words of known classification co-appearing in a document, learning data of a positive example that is comprised of the context information and the layout information of an identically-classified word pair of known classification, being a set of the above identically-classified words of known classification, and based upon context information and layout information between differently-classified words of known classification co-appearing in the document, learning data of a negative example that is comprised of the context information and the layout information of a differently-classified word pair of known classification, being a set of the above differently-classified words of known classification, and creating an inter-word pattern for judging whether the data of the word pair, being a set of the inputted word of unknown classification and the word of known classification, is the positive example or the negative example based upon the foregoing learning data, an inter-word pattern storing section in which the foregoing created inter-word patterns are stored, an inter-word pattern application section for, based upon a relation between the inputted word of unknown classification and the word of known classification co-appearing in the document, creating application data that is comprised of the context information and the layout information of the word pair, being a set of the foregoing word of unknown classification and the foregoing word of known classification, analyzing foregoing application data of the word pair by making a reference to the foregoing inter-word pattern, and outputting whether the foregoing application data of the word pair is the positive example or the negative example, a classification determination section for determining classification of the word of unknown classification of the foregoing word pair based upon the number of the positive examples or the negative examples of the foregoing application data of the word pair, and the classification of the word of known classification of the foregoing word pair.

The present invention for solving the above-mentioned problems is a learning data creation apparatus for creating learning data being employed for determining classification of a word of unknown classification of which the classification is unknown, which includes a learning data creation section for creating the learning data that is comprised of at least either the context information or the layout information between words of known classification co-appearing in the document.

The present invention for solving the above-mentioned problems is a word classification method of learning at least either context information or layout information between the words of known classification that co-appear, based upon a relation between the words of known classification co-appearing in a document, and employing an inter-word pattern for judging whether data of a word pair, being a set of the words, is data of an identically-classified word pair, being a set of the identically-classified words, or data of a differently-classified word pair, being a set of the differently-classified words, for determining classification of a word of unknown classification.

The present invention for solving the above-mentioned problems is a word classification method of creating, based upon context information and layout information between identically-classified words of known classification co-appearing in a document, learning data of a positive example that is comprised of the context information and the layout information of an identically-classified word pair of known classification, being a set of the above identically-classified words of known classification, and based upon context information and layout information between differently-classified words of known classification co-appearing in a document, learning data of a negative example that is comprised of the context information and the layout information of a differently-classified word pair of known classification, being a set of the above differently-classified words of known classification, creating an inter-word pattern for judging whether the data of a word pair, being a set of an inputted word of unknown classification and the word of known classification, is a positive example or a negative example based upon the foregoing learning data, based upon a relation between the word of unknown classification and the word of known classification co-appearing in the document, creating application data that is comprised of the context information and the layout information of the word pair, being a set of the foregoing word of unknown classification and the foregoing word of known classification, analyzing the foregoing application data of the word pair by making a reference to the foregoing inter-word pattern, judging whether the foregoing application data of the word pair is the positive example or the negative example, and determining classification of the word of unknown classification of the foregoing word pair based upon the number of the positive examples or the negative examples of the forgoing application data of the word pair, and the classification of the word of known classification of the foregoing word pair.

The present invention for solving the above-mentioned problems is a learning data creation method of creating learning data being employed for determining classification of the word of unknown classification of which the classification is unknown, wherein the learning data that is comprised of at least either the context information or the layout information between words of known classification co-appearing in a document is created.

The present invention for solving the above-mentioned problems is a program for causing an information processing apparatus to execute an inter-word pattern learning process of learning at least either context information or layout information between words of known classification that co-appear based upon a relation between words of known classification co-appearing in a document, creating an inter-word pattern for judging whether data of a word pair, being a set of the words, is data of an identically-classified word pair, being a set of the identically-classified words, or data of a differently-classified word pair, being a set of the differently-classified words.

The present invention for solving the above-mentioned problems is a program for causing an information processing apparatus to execute a process of creating, based upon context information and layout information between identically-classified words of known classification co-appearing in a document, learning data of a positive example that is comprised of the context information and the layout information of an identically-classified word pair of known classification, being a set of the above identically-classified words of known classification, and based upon context information and layout information between differently-classified words of known classification co-appearing in the document, learning data of a negative example that is comprised of the context information and the layout information of a differently-classified word pair of known classification, being a set of the above differently-classified words of known classification, a process of creating an inter-word pattern for judging whether the data of a word pair, being a set of the inputted word of unknown classification and the word of known classification, is the positive example or the negative example based upon the foregoing learning data, a process of, based upon a relation between the word of unknown classification and the word of known classification co-appearing in the document, creating application data that is comprised of the context information and the layout information of the word pair, being a set of the foregoing word of unknown classification and the foregoing word of known classification, a process of analyzing the foregoing application data of the word pair by making a reference to the foregoing inter-word pattern, and judging whether the foregoing application data of the word pair is the positive example or the negative example, and a process of determining classification of the word of unknown classification of the foregoing word pair based upon the number of the positive examples or the negative examples of the forgoing application data of the word pair, and the classification of the word of known classification of the foregoing word pair.

An Advantageous Effect of the Invention

The present invention makes it possible to determine the classification of the words detailedly because a relation between the words of known classification that co-appear is employed as data in use for the classification determination.

BRIEF DESCRIPTION OF THE DRAWINGS

FIG. 2 is a view illustrating one example of a words-of-known-classification database 1.

FIG. 3 is a view illustrating one example of a documents database 2.

FIG. 4 is a view illustrating one example of the learning data in the first embodiment.

FIG. 5 is a view illustrating one example of the learning data in the first embodiment.

FIG. 7 is a view illustrating one example of the learning data in the second embodiment.

Figure 1:
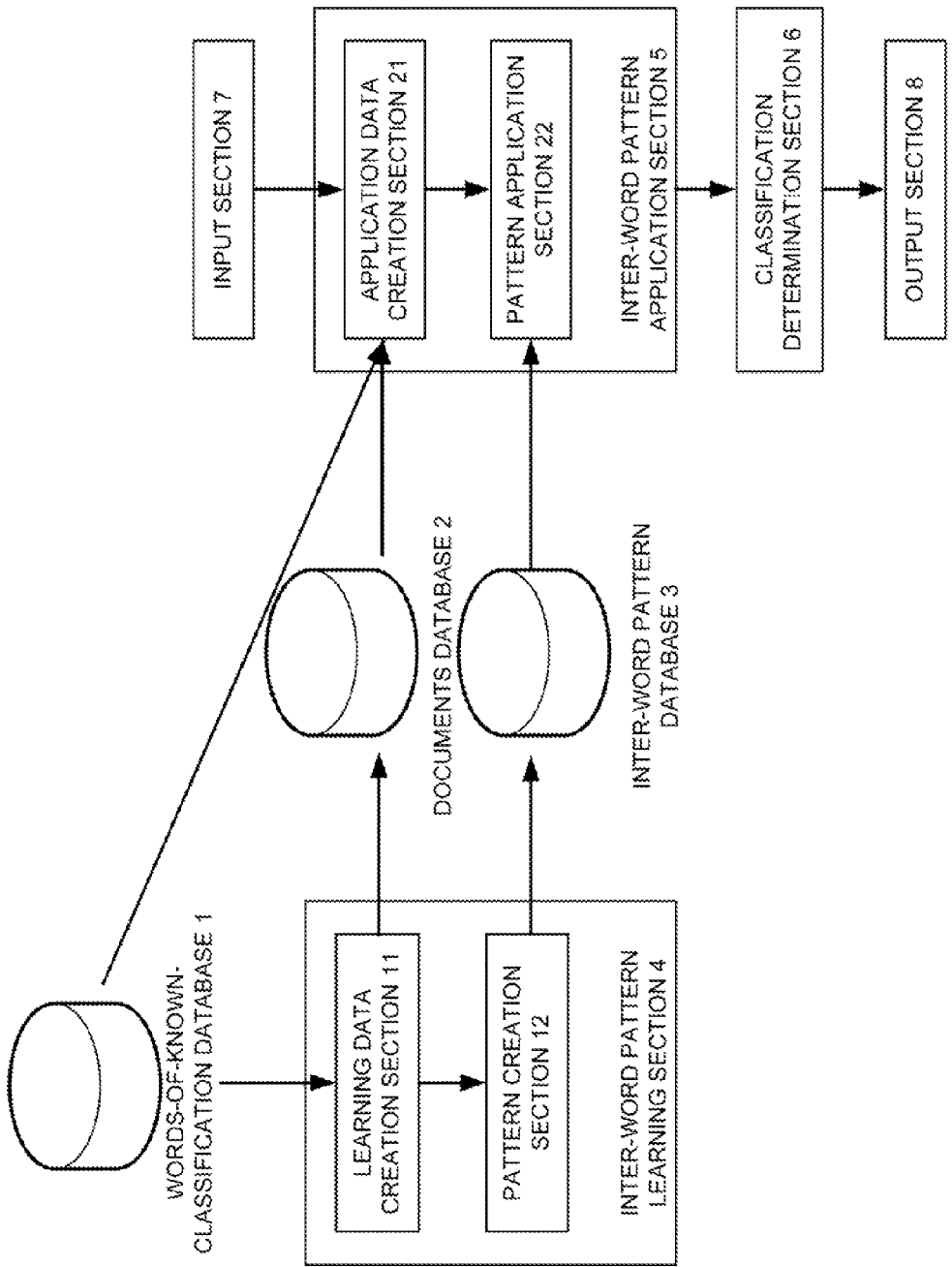
FIG. 1 is a block diagram of the word classification system of a first embodiment.

DESCRIPTION OF NUMERALS 1 words-of-known-classification database
2 documents database
3 inter-word pattern database
4 inter-word pattern learning section
5 inter-word pattern application section
6 classification determination section
7 input section
8 output section

BEST MODE FOR CARRYING OUT THE INVENTION

Features of this embodiment will be explained.

The identically-classified words often co-appear in one sentence, the words between the identically-classified words are often identical to each other, and the parts-of speech between the identically-classified words are often identical to each other. Thus, taking into consideration not only the context information of each word but also a relation between the identically-classified words makes it possible to perform more detailed word classification.

Herein, the so-called relation between the words is indicative of a surface character string between two words, the number of times of occurrences thereof, parts of speech, the number of times of co-occurrences, the layout information, and the like. For example, the professional baseball team names of Japan are often described in the sentence of a news article as counterparty, and are continuously described by use of punctuations, symbols, etc. in many cases. However, with a relation between the professional baseball team name of Japan and the professional baseball team name of US, only information of trade, or the like is described, and its frequency is not so many. In addition, a possibility that it is continuously described by use of punctuations, symbols, etc. is few.

Thereupon, the present invention creates pattern data for determining the classification of the not-yet-classified word (hereinafter, referred to as a word of unknown classification) based upon a relation between the words of which the classification is known (hereinafter, referred to as a word of known classification).

For example, it is assumed classification A: {a, b, c}, classification B: {d, e}, and classification C: {g, h} are given. Herein, it is assumed that each of a, b, c, d, e, g, and h is a word, and a classification name {word aggregation} is expressive of a classification name and a word aggregation thereof. Additionally, the words such as a, b, c, d, e, g, and h do not need to be the core word described above, and the core word may be a word of a movie name itself, for example, [AAA Wars] and [BBB Story], and be a word of a team name itself, for example, [C team].

And, the present invention creates the learning data from a relation between the words for each word pair of the words of known classification. At this time, the present invention defines a word pair of the words of known classification that are of identical classification (hereinafter, referred to as an identically-classified word of known classification) as the positive example, and a word pair of the words of known classification that are of different classification (hereinafter, referred to as a differently-classified word of known classification) as the negative example. For example, the word of known classification a and the word of known classification b are of identical classification, and the word pair thereof (also hereinafter, the word pair is expressed as a-b) is a word pair of the identically-classified words of known classification, whereby the word pair of the identically-classified words of known classification is the positive example. Further, the word of known classification a and the word of known classification d are of different classification, and the word pair thereof (also hereinafter, the word pair is expressed as a-d) is a word pair of the differently-classified words of known classification, whereby the word pair of the differently-classified words of known classification is the negative example.

The so-called relation between the words is context information and layout information between the word a and the word b of the document in which the word a and the word b appear. Herein, the so-called context information is a word itself, an adjoining word, a surface character string of the word existing between the words, the number of times of occurrences, the type of speech, a character type, a co-occurrence frequency, a distance between the words, a dependency relation, and information as to whether the word exists in the natural sentence. Further, the so-called layout information is information as to whether the words are arranged longitudinally or traversely, information as to whether the size of the character is identical, and information as to whether a depth of a tree is identical with the case of a tree structure such as HTML.

In such a manner, the present invention creates the learning data that is comprised of at least either the context information or the layout information between the words of known classification based upon a relation between the words of known classification. Continuously, the present invention creates the inter-word pattern for judging whether the data of the word pair, being a set of the inputted word of unknown classification and the word of known classification, is the positive example or the negative example based upon this learning data.

And, the present invention determines whether the data of the word pair, being a set of the inputted word of unknown classification and the word of known classification, is the positive example or the negative example by employing this inter-word pattern, and determines the classification of the word of unknown classification based upon a result of the determination.

Hereinafter, specific embodiments will be explained.

First Embodiment

The first embodiment will be explained.

FIG. 1 is a block diagram of the word classification system of the first embodiment.

The word classification system of the first embodiment includes a words-of-known-classification database 1 having the words of which the classification is known stored therein, a documents database 2 having the documents stored therein, an inter-word pattern database 3 in which the learned inter-word patterns are stored, an inter-word pattern learning section 4 for learning the context information and the layout information between the words of known classification from a word aggregation of known classification stored in the words-of-known-classification database 1, and creating the inter-word pattern, an inter-word pattern application section 5 for judging the application data of the word pair including the word of which the classification is unknown by employing the inter-word pattern stored in the inter-word pattern database 3, a classification determination section 6 for determining the classification of the word of which the classification is unknown based upon a judgment result by the inter-word pattern application section 5, an input section 7 such as a keyboard for inputting the word of which the classification is unknown, and an output section 8 for outputting a determination result by the classification determination section 6.

The words-of-known-classification database 1 has the words of which the classification is known stored therein for each classification. One example of the words-of-known-classification database 1 is shown in FIG. 2. In FIG. 2, a plurality of the classifications are preserved in a format of [classification name {words}]. For example, [classification A {a, b, c}] indicates that the word a, the word b, and the word c are classified in the classification A. This storage method is one example, and one word may belong to a plurality of the classifications and the classification name may be described word by word.

The documents database 2 has a plurality of the documents stored therein. One example of the documents database 2 is shown in FIG. 3. In FIG. 3, one document is shown in one record, and [ . . . ] in the figure is expressive of omission.

The inter-word pattern database 3 has the inter-word pattern created by the inter-word pattern learning section 4 stored therein. This inter-word pattern is a pattern for, when the data of a relation between two words is inputted, indicating whether or not the above data is data in which two words are of identical classification. The description method of the inter-word pattern differs depending upon a learning algorithm. For example, when the Support Vector Machines is employed, it is described with binary data. Additionally, the inter-word pattern will be described later.

The inter-word pattern learning section 4 inputs the words of known classification stored in the words-of-known-classification database 1, and creates the learning data while making a reference to the documents of the documents database 2. And, the inter-word pattern learning section 4 creates the inter-word pattern based upon the learning data. The inter-word pattern learning section 4 includes a learning data creation section 11 and a pattern creation section 12.

The learning data creation section 11, for each occurrence position in which the word pair, being a set of the words of known classification stored in the words-of-known-classification database 1, co-appear in the document stored in the documents database 2, learns the context information and the layout information based upon a relation between the above words, and creates the learning data that is comprised of the context information and the layout information of the above word pair.

For example, when [classification A: {a, b, c}], [classification B: {d, e}], and [classification C: {g, h}] are given, the learning data creation section 11 creates word pairs of a-b, a-c, a-d, a-e, a-g, a-h, b-c, b-d, b-e, b-g, b-h, c-d, c-e, c-g, c-h, d-e, d-g, d-h, e-g, e-h, and g-h (hereinafter, the word pair is expressed, for example, as a-b).

At this time, the word pair of the identically-classified words of known classification is defined as the positive example, and the word pair of the differently-classified words of known classification as the negative example. For example, the word pair of the word a and the word b is of identical classification, and is the positive example because both of the word a and the word b belong to the classification A. Further, the word pair of the word a and the word d is of different classification, and is the negative example because the word a belongs to the classification A and the word d belongs to the classification B.

Further, the so-called relation between the words is the context information and the layout information between the words of the document in which the word a and the word b appear. Herein, the so-called context information is a word itself, an adjoining string, a surface character string of the word existing between the words, the number of times of occurrences, the type of speech, a character type, a co-occurrence frequency, a distance between the words, a dependency relation, and information as to whether the word exists in the natural sentence. Further, the so-called layout information is information as to whether the word a and the word b are arranged longitudinally or traversely, information as to whether the size of the character is identical, and information as to whether a depth of a tree is identical with the case of a tree structure such as HTML.

In such a manner, the learning data creation section 11 creates the learning data including the context information and the layout information of the word pair, and the information of the positive example or the negative example of the above word pair for each occurrence position in which these word pairs co-appear in the document stored in the documents database 2.

The pattern creation section 12 learns the pattern based upon the learning data created by the learning data creation section 11, and creates the inter-word pattern data. For example, the pattern creation section 12 creates the inter-word pattern such that when the application data of the inputted word pair is data indicative of the identical classification, the above word pair is determined to be the positive example, and when the application data of the inputted word pair is data indicative of the different classification, the above word pair is determined to be the negative example. And, the pattern creation section 12 registers the created inter-word pattern into the inter-word pattern database 3. Additionally, the existing algorithm such as the support Vector Machines is employed for creating the inter-word pattern data itself.

The inter-word pattern application section 5 inputs the word of which the classification is unknown from the input section 7, and determines the application data of the word pair including this word of unknown classification. The inter-word pattern application section 5 includes an application data creation section 21, and a pattern application section 22.

The application data creation section 21 creates the application data for the inputted words of unknown classification by making a reference to the words stored in the words-of-known-classification database 1, of which the classification is known, and the documents of the documents database 2. Herein, the application data creation section 21 creates the word pair of the word of unknown classification and each of the words of known classification stored in the words-of-known-classification database 1. For example, when a word of unknown classification f is given, the application data creation section 21 creates the word pair of f-a, f-b, f-c, f-d, f-e, f-g, and f-h from the word of unknown classification f and the words of known classification a, b, c, d, e, g, and h. And, for each occurrence position in which these word pairs co-appear in the document stored in the documents database 2, the application data creation section 21 creates the application data, which is comprised of the context information and the layout information of the above word pair, based upon a relation between the above words. Additionally, this application data is similar to the learning data of the foregoing learning data creation section 11 except for the information of the positive example and the negative example of the word pair.

The pattern application section 22 inputs the application data of the word pair of the word of unknown classification and the word of known classification, and analyzes the above application data of the word pair by making a reference to the inter-word pattern stored in the inter-word pattern database 3. And, the pattern application section 22 output whether the application data of the word pair of the word of unknown classification and the word of known classification is the positive example or the negative example. Additionally, the pattern application section 22, similarly to the inter-word pattern creation section 12, employs the existing algorithm such as the support Vector Machines.

The classification determination section 6 inputs the information of the positive example or the negative example of the application data of the word pair of the word of unknown classification and the word of known classification, and the classification of the word of known classification of the above word pair, calculates a classification score, and determines the classification of the word of unknown classification. As a method of determining the classification, there exists the method of calculating the number of the positive examples with the word of known classification for each classification, and determining the classification of the word of unknown classification.

Next, an operation of this embodiment will be explained by making a reference to a configuration of FIG. 1.

At first, the inter-word pattern learning section 4 inputs the words stored in the words-of-known-classification database 1, of which the classification is known, and creates the learning data while making a reference to the documents of the documents database 2. And, the inter-word pattern learning section 4 creates the inter-word pattern based upon the learning data.

Specifically, the learning data creation section 11 inputs the words of known classification stored in the words-of-known-classification database 1 and the documents of the documents database 2 for the word pairs obtained by combining all of the words of known classification stored in the words-of-known-classification database 1, learns the context information and the layout information based upon a relation between the words for each occurrence position in which the word of the above word pair co-appears in the document, and creates the learning data. The learning data creation section 11 creates the learning data from the context information and the layout information between the words.

For example, the learning data creation section 11 creates the learning data for all of the combinations of the words (pair words) of a, b, c, d, e, g, and h, being the words of known classification shown in FIG. 2, for each occurrence position of the document in which these word pairs appear.

One example of the learning data of the word pair a-b is shown in FIG. 4 and FIG. 5. Herein, FIG. 4 shows one example of the learning data created based upon the occurrence position of the word pair a-b in the document of the first-place record in FIG. 3, and FIG. 5 shows one example of the learning data created based upon the occurrence position of the word pair a-b in the document of the second-place record in FIG. 3.

The context information indicates the inter-word surface character strings, the inter-word parts of speech, the inter-word character types (hiragana, kanji, a numerical number, a symbol, an alphabet, a tag), information as to whether the word exists in phrase (in a Japanese sentence) having a dependency relation, information as to whether the word exists in the phrase having a coordination, and the morphology number between the words.

The layout information indicates information as to whether the word appears in the natural sentence, information as to whether the words are equally arranged crosswise, information as to whether the size of the word is identical, and information as to whether the left and the right strings are identical to each other.

Herein, the existing morphological analysis tool such as chasen can be employed for separation of the word, the type of speech and the morphology number between the words. The existing structure analysis tool such as cabocha can be employed for the dependency and the coordinate relation recognition. A dictionary of the morphological analysis tool is preferably preset so that the types of speech of the strings related to the HTML tags such as "<td>" 対 (versus) "</td>" in FIG. 5 are recognized as "<unknown word-starting tag>" and "<unknown word-finishing tag>. The reason is that normally, these strings result in being recognized as an unknown word, and being recognized simply as a symbol or an alphabet, and hence, the effectual learning is impossible.

Further, whether or not the words are equally arranged crosswise, and the size of the character are determined from a layout location thereof by employing a drawing tool of each document. At this time, think about the case that the document is drawn in a standard size. For example, with the case of the HTML data, an output drawn in a screen size of 1024×768 with the existing Web browser is employed. Further, with the case of the HTML data, the size of the string and the drawing position are often governed by HTML tag information, whereby a determination may be made by utilizing the tag information without making the actual layout.

The context information such as the surface character strings between the words, the parts of speech, the character types, and the dependency relation are utilized for the learning data because the words of the identical kind appear in the identical document, and the words existing between them are also described by use of the word expressive of the coordinate relation such as 「と (and)」 and symbols such as punctuation and 「•」 in many cases.

With the case of not the natural sentence but the semi-structured data such as HTML, the layout information, for example, information as to whether the words are equally arranged crosswise, and information as to whether the size of the word is identical is employed for the learning data because the strings of an identical kind are often arranged based upon the layout information such as a table. Further, with case of the HTML data, the string is employed for the learning data because the left and right strings are identical to each other so far as the identical layout concerned. The system holds a length of the string that is employed for the determination. It is assumed that the length in this embodiment is a four-character length.

An example of the learning data of FIG. 4 will be explained. Upon making a reference to the document of the first-place record of FIG. 3, a character of 「と (and)」 exists between a position in which the word pair a-b appears. When the morphological analysis tool is employed, it can be seen that this is a particle. This character type includes hiragana. Further, when the structure analysis tool is employed, it can be seen that the phrase in the occurrence position of the word pair a-b is not in a dependency relation but in a coordinate relation. It can be seen that these two words exist in the natural sentence because they are not surrounded by the HTML tag etc. When they are drawn by text editor, it can be seen that they are arranged traversely. The size of the string is also identical. It can be also seen that the left and right four characters of a and that of b are not identical. This yields the example of the learning data of FIG. 4.

An example of the learning data of FIG. 5 will be explained. Upon making a reference to the document of the second-place record of FIG. 3, [</td><td>对 (versus)</td><td>] exists between a position in which the word pair a-b appears. When this [</td><td>对 </td><td>] is subjected to the morphological analysis, it is separated into five words of "</td>", "<td>", 对 "</td>", and "<td>", and it can be seen that "</td>" is a finishing tag, "<td>" is a starting tag, and 对 is noun. With the character type, "</td>" includes a tag, and 对 includes kanji. When the structure is analyzed, it can be seen that the a and b are not in a dependence relation. Further, it can be seen that the a and b are not in a coordinate relation as well. It can be seen that these two words do not exist in the natural sentence because the adjacency thereof is surrounded by the tags. When the layout is actually performed therefor, it can be seen that they are arranged traversely, and the size of the string is also identical because the table tag exists. The strings in the adjacency of respective words are "<td>" with the front side, and "</td>" with the rear side, and are identical to each other. This yields the example of the learning data of FIG. 5.

The examples described above are only one example, respectively, and with the case of the semi-structured data such as HTML, the learning data may include information as to whether the depth of the tree is identical besides them. Further, the learning data may include not only the context information and the layout information between the words, but also the by-word context information as shown in the related example.

In such a manner, the learning data creation section 11 creates one piece of the learning data for each of the occurrence positions of all of the word pairs. Additionally, the learning data creation section 11 creates the learning data by affixing the information of the positive example to the learning data of the word pair of the identically-classified words of known classification, and the information of the negative example to the learning data of the word pair of the differently-classified words of known classification.

Next, the pattern creation section 12 creates the inter-word pattern based upon the learning data created by the learning data creation section 11. This embodiment employs the Support Vector Machines. The Support Vector Machines learns the inter-word pattern for separating the positive example and the negative example. This allows the inter-word pattern such that the application data of the word pair, which is indicative of the identical classification, becomes the positive example, and the application data of the word pair, which is indicative of the different classification, becomes the negative example to be learned.

The inter-word pattern application section 5 inputs the word of which the classification is unknown from the input section 7, and outputs whether or not this word of unknown classification belongs to classification identical to the classification of the word of known classification that forms a pair with this word of unknown classification.

Specifically, the application data creation section 21 creates the application data for the word of unknown classification inputted from the input section 7 by making a reference to the words stored in the words-of-known-classification database 1, of which the classification is known, and the documents of the documents database 2. For all of the combinations (word pairs) of the word of unknown classification f and the words of known classification a, b, c, d, e, g, and h, the application data creation section 21 creates the application data for each of the occurrence positions of the document in which these word pairs appear.

For example, for f-a, f-b, f-c, f-d, f-e, f-g, and f-h each of which is the word pair of the word of unknown classification f and each of the words of known classification a, b, c, d, e, g and h, the application data creation section 21 creates the application data for each occurrence position of the document stored in the documents database 2 in which the words of the word pair co-appear. That is, three pieces of the application data are created when the number of the occurrence locations within the documents is three with the word pair f-a. Herein, the application data is created by employing a method identical to the method of creating the learning data.

Next, the pattern application section 22 outputs whether or not the application data of the word pair is of identical classification for each application data coming from the application data creation section 21 by making a reference to the inter-word patterns stored in the inter-word pattern database. Information of the positive example or the negative example is outputted for each application data of the word pair when the Support Vector Machines is employed for the pattern application section 22. When the application data of the word pair is the positive example, it is of identical classification, and when the application data of the word pair is the negative example, it is of different classification. For example, a possibility that when the number of the occurrence locations of the word pair f-a is three (the number of the application data is three), two pieces of application data are the positive example and one application data is the negative example exists. Further, even though the number of the occurrence locations of the word pair f-b is four (the number of the application data is four), a possibility that all of four are the positive example also exists.

The classification determination section 6, upon receipt of a result from the pattern application section 22, determines the classification of the word of unknown classification. For example, the classification determination section 6 determines the classification of the word of unknown classification based upon a probability that the word pair of the word of unknown classification and the word of known classification is a word pair of the identically-classified words, which is obtained from the number of the positive examples or the negative examples of the application data. And, the classification determination section 6 outputs a determination result (classification name) to the output section 8.

One example of determining the classification of the word of unknown classification will be explained.

The classification determination section 6 calculates a classification score of the classification of each word pair, and decides the classification of the word of unknown classification to be classification having a highest score, out of the classification of which the classification score is equal to or more than a threshold. For example, the classification score is obtained with the following equation.

Classification score (classification)=the number (classification) of the application data of the word pairs of the positive example/the number (classification) of all of pieces of the application data of the word pairs The number of the application data (classification) of the word pairs of the positive example is the number of the application data that has become the positive example, out of the application data of the word pairs of a certain word of known classification and the word of unknown classification. Further, the number (classification) of all of pieces of the application data of the word pairs is the number of all of pieces of the application data of the word pairs of the word of known classification and the word of unknown classification.

For example, when it is assumed that the words belonging to the classification A are a, b, and c, and the word of which the classification is unknown is f, the number of all of pieces of the application data of the word pairs f-a, f-b, and f-c is the number of all of pieces of the application data of the word pairs (classification A). Further, out of the application data of the word pairs f-a, f-b, and f-c, the number of the application data that have become the positive example is the number of the application data of the word pairs of the positive example (classification A).

Herein, as a result of determining the application data of the word pair including the word of unknown classification f, when the number of pieces of the application data of the word pairs of the positive example (classification A) is one, the number of all of pieces of the application data of the word pairs (classification A) is three, the number of pieces of the application data of the word pairs of the positive example (classification B) is two, the number of all of pieces of the application data of the word pairs (classification B) is two, the number of pieces of the application data of the word pairs of the positive example (classification C) is zero, and the number of all of pieces of the application data of the word pairs (classification C) is two, the classification score (classification A) becomes 1/3, the classification score (classification B) becomes 2/2, and the classification score (classification C) becomes 0/2. Thus, the classification of the word of unknown classification f becomes the classification B having a highest classification score.

The classification score mentioned above is one example, and the other methods such as a method of simply summing up the application data that becomes the positive example may be employed.

The application data, of which the classification score is less than the threshold, is classified as being unknown.

Above, this embodiment makes it possible to more detailedly classify the words as compared with the conventional technique because the inter-word pattern learning section learns the classification rule by employing not the by-word context information but the inter-word context information and layout information between the identically-classified words and the inter-word context information and layout information between the differently-classified words.

Second Embodiment

The second embodiment will be explained.

Figure 6:
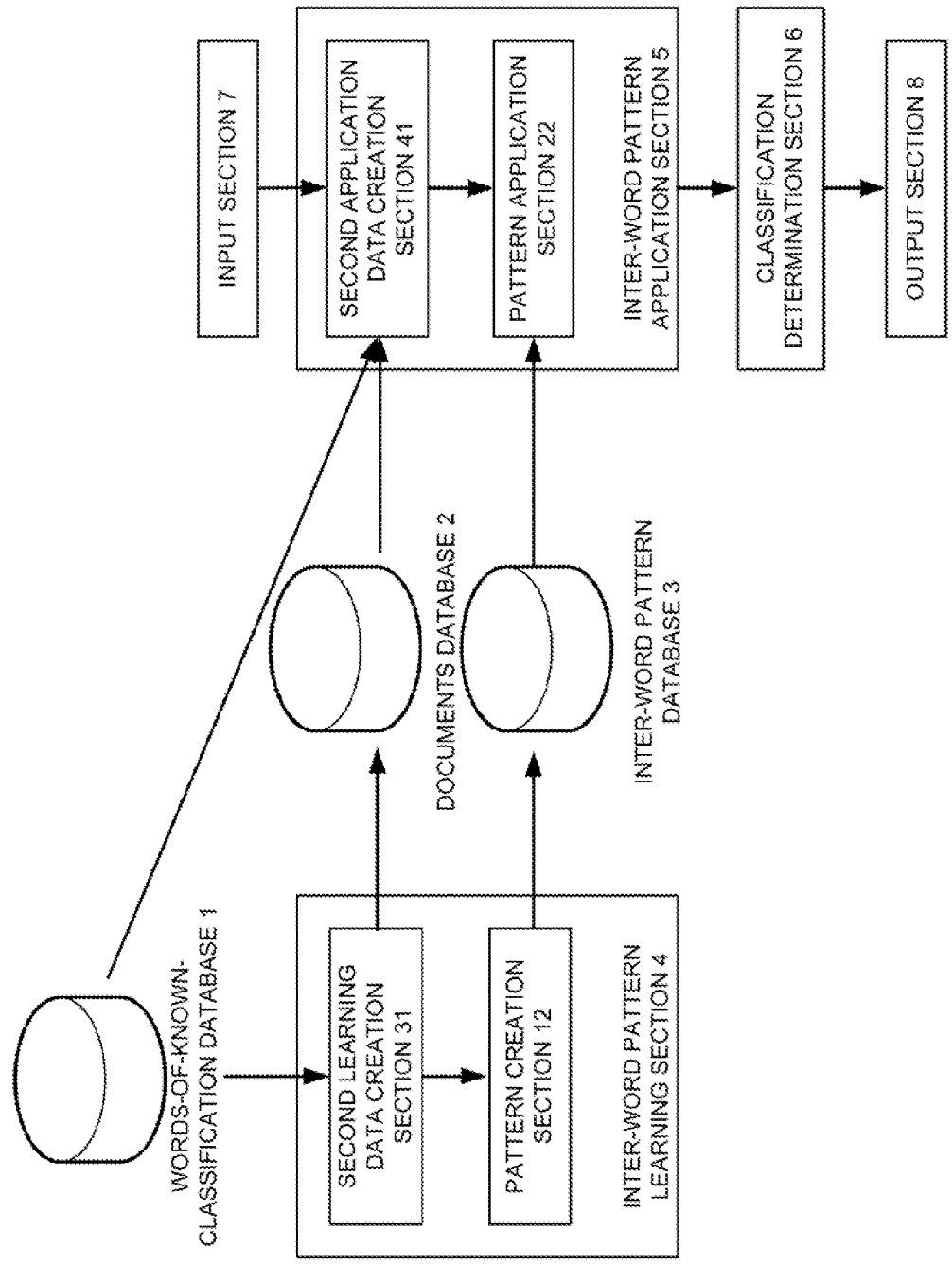
FIG. 6 is a block diagram of the word classification system in a second embodiment.

FIG. 6 is a block diagram of the word classification system of the second embodiment.

Upon making a reference to FIG. 6, a difference with the first embodiment lies in a point that the learning data creation section 11 is replaced with a second learning data creation section 31, and the application data creation section 21 is replaced with a second application data creation section 41. Hereinafter, an explanation will be made with a difference point at a center.

The second learning data creation section 31 differs from the learning data creation section 11 in a point of not creating the learning data whenever the word pair appears in the document, but creating the learning data word pair by word pair.

The second learning data creation section 31 additionally adds the statistics amount such as an occurrence frequency of the word pairs and a mutual information amount that can be calculated based upon the occurrence frequency as the context information. Further, the second learning data creation section 31 employs the string that has numerically appeared as an inter-word character, the type of speech thereof, the character type, a value obtained by dividing the number of times of the dependencies by the number of the occurrences, a value obtained by dividing the number of times of the coordinate relations by the number of the occurrences, and an average of the morphology numbers between the words as the context information when a plurality of the identical word pairs appear in the document. Further, the second learning data creation section 31 employs a value obtained by dividing the number of times the word appears in the natural sentence by the number of the occurrences, a value obtained by dividing the number of times the words are equally arranged crosswise by the number of the occurrences, a value obtained by dividing the number of times the size of the string is identical by the number of the occurrences, and a value obtained by dividing the number of times the left string and the right string are identical to each other by the number of the occurrences as the layout information. With these methods, one piece of the learning data is created for one word pair.

The second application data creation section 41 differs from the application data creation section 21 in a point of not creating the application data whenever the word pair appears in the document, but creating the learning data word pair by word pair. The method of creating the application data is identical to that of the second learning data creation section 31.

Next, an operation of the entirety of this embodiment will be explained by making a reference to a configuration of FIG. 6. Additionally, the second learning data creation section 31 and the second application data creation section 41, which are portions in which the second embodiment and the first embodiment differ, will be explained mainly.

For each word pair, being a pair of the words of known classification stored in the words-of-known classification database 1, the second learning data creation section 31 creates the learning data that is comprised of the context information and the layout information of the above word pair. For example, the second learning data creation section 31 creates the learning data for each of all of the combinations of the words of a, b, c, d, e, g, and h, being the words of known classification shown in FIG. 2.

Herein, one example of the learning data of the word pair a-b is shown in FIG. 7. Additionally, it is assumed that the word pair a-b appears in the document of the first-place record and the document of the second-place record of the documents database 2 shown in FIG. 3. Then, the context information of the word pair a-b shown in FIG. 7 indicates the top three of the inter-word surface character strings having a higher occurrence frequency, respective types of speech, respective character types between the words, a value obtained by dividing the number of times the word pair a-b exists in the phrase having a dependency relation therewith by the number of the occurrences, a value obtained by dividing the number of times the word pair a-b exists in the phrase having a coordinate relation therewith by the number of the occurrences, an average of the morphology numbers between the words, and the number of the co-occurrences. The layout information of the word pair a-b shown in FIG. 7 indicates a value obtained by dividing the number of times the word pair a-b appears in the natural sentence by the number of the occurrences, a value obtained by dividing the number of times the word pair a-b is equally arranged crosswise by the number of the occurrences, a value obtained by dividing the number of times the size of the character is identical by the number of the occurrences, and a value obtained by dividing the number of times the left string and the right string are identical to each other by the number of the occurrences.

Each of these pieces of the learning data is one example, and the number of the information indicative of the number such as the dependency relation, the coordinate relation, and the number of times of the occurrences in the natural sentence may be defined as one (1) when the above information has appeared for once, and a combination thereof may be employed. The statistics amount such as the mutual information amount may be employed for the number of times of the co-occurrence.

And, similarly to the first embodiment, the second learning data creation section 31 creates the learning data by adding the information of the positive example or the negative example of the word pair, and outputs this learning data to the pattern creation section 12.

The second application data creation section 41 inputs the word of unknown classification from the input section 7, and creates the application data for the inputted word of unknown classification by making a reference to the words stored in the words-of-known classification database 1, of which the classification is known, and the documents of the documents database 2. Herein, the second application data creation section 41 creates the word pair of the word of unknown classification and each of the word of known classification stored in the words-of-known classification database 1. For example, when the word of unknown classification f is given, the second application data creation section 41 creates the word pair of f-a, f-b, f-c, f-d, f-e, f-g, and f-h from the word of unknown classification f and the words of known classification a, b, c, d, e, g, and h. And, the second application data creation section 41 creates the application data that is comprised of the context information and the layout information for each of these word pairs. The application data is created by employing a method identical to the method of the second learning data creation section 31.

Another configuration is similar to that of the first embodiment, so its explanation is omitted.

In this embodiment, the second learning data creation section can additionally add the co-occurrence frequency between the words to the learning data.

Third Embodiment

The third embodiment will be explained.

Figure 8:
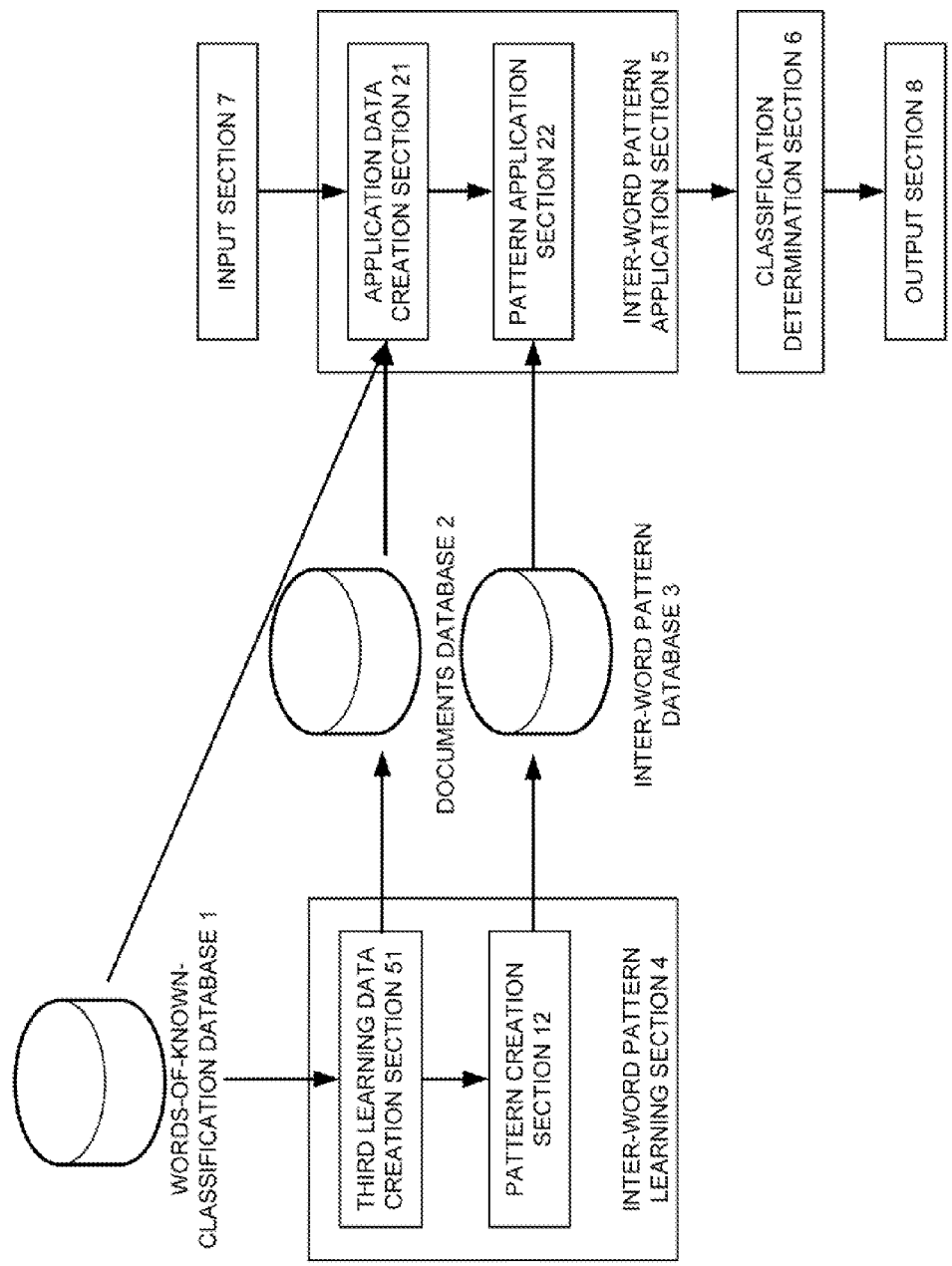
FIG. 8 is a block diagram of the word classification system of the second embodiment.

FIG. 8 is a block diagram of the word classification system of the third embodiment.

Upon making a reference to FIG. 8, the third embodiment differs from the first embodiment in a point that the learning data creation section 11 is replaced with a third learning data creation section 51.

In the first embodiment and the second embodiment, at the moment of applying the inter-word pattern, even though the word of unknown classification is inputted, it cannot be caused to correspond to the word of any classification, and resultantly, it becomes a not-yet classified word in some cases because the number of the learning data of the negative example becomes more than the number of learning data of the positive example. The reason why the number of the learning data of the negative example becomes very numerous is that the word pair of the differently-classified words of known classification is all defined as the negative example.

Thereupon, the third embodiment handles only the word pair satisfying a specific condition, out of the word pairs of the differently-classified words of known classification, as the negative example, thereby curtailing the data amount of the learning data of the negative example. Herein, the so-called specific condition is that a frequency that two words appear, a co-occurrence probability, or a mutual information amount is high. Giving such a condition promotes adaptation of only the typified example as the negative example to the learning data, and then suppresses an undue increase in the negative example.

Hereinafter, an explanation will be made with a difference point at a center.

The third learning data creation section 51 creates the learning data of only the word pair satisfying a certain condition without creating the learning data of all of the word pairs with regard to the learning data of the differently-classified word pair. The so-called specific condition is that a occurrence frequency of the word pair, a co-occurrence probability, or a mutual information amount is high. The method of creating the learning data is identical to the method of the first embodiment or the second embodiment.

Upon making an explanation specifically, the third learning data creation section 51 inputs the words of known classification of the words-of-known-classification database 1, makes a reference to the documents, and creates the learning data for each of all of the word pairs of the words of known classification. The third learning data creation section 51 creates the learning data from the context information and the layout information between the words similarly to the case of the first embodiment or the second embodiment. For example, the third learning data creation section 51 creates the word pairs, being a combination of the words of a, b, c, d, e, g, and h, from the words of known classification of the words-of-known-classification database 1 shown in FIG. 1, and creates the learning data for each of these word pairs. However, the third learning data creation section 51 creates only the learning data of the word pairs satisfying a specific condition, out of the word pairs, with regard to the learning data of the word pair of the differently-classified words of known classification.

That is, the third learning data creation section 51 creates the learning data of the identically-classified word pairs a-b, a-c, d-e, and g-h similarly to the case of the first embodiment or the second embodiment. Further, the third learning data creation section 51 creates the learning data of only the word pairs satisfying a specific condition, out of the differently-classified word pairs a-d, a-e, a-g, a-h, b-d, b-e, b-g, b-h, c-d, c-e, c-g, c-h, d-g, d-h, e-g, and e-h. Herein, the so-called specific condition signifies that an occurrence frequency of the word pair, a co-occurrence probability, or a mutual information amount exceeds a certain threshold, or signifies the top several of the word pairs. The threshold or the top several are preserved in advance in the system. Thereafter, the third learning data creation section 51, similarly to the learning data creation section 11 of the first embodiment, or the second learning data creation section 31 of the second embodiment, creates the learning data.

In this embodiment, the third learning data creation section adapts only the typified negative example for the learning data, thereby suppressing an undue increase in the negative example. This makes it possible to raise a classification precision.

Additionally, while the context information and the layout information were employed as the relation between the words in the first embodiment to the third embodiment mentioned above, one of them may be employed.

Further, while the learning data creation section, the pattern creation section, the application data creation section, and the pattern application section were configured with hardware in the first embodiment to the third embodiment, one part or the entirety thereof can be configured with CPU etc. that operates under a program.

The 1st mode of the present invention is characterized in that a word classification system, comprising an inter-word pattern learning section for, based upon a relation between words of known classification co-appearing in a document, learning at least either context information or layout information between the words of known classification that co-appear, and creating an inter-word pattern for judging whether data of a word pair, being a set of the words, is data of an identically-classified word pair, being a set of identically-classified words, or data of a differently-classified word pair, being a set of differently-classified words.

In additions, the 2nd mode of the present invention, in the above-mentioned mode, is characterized in that the word classification system comprising: an inter-word pattern application section for, based upon a relation between an inputted word of unknown classification and the word of known classification co-appearing in the document, creating application data of the word pair, being a set of said word of unknown classification and said word of known classification, said application data comprised of at least either the context information or the layout information between said word of unknown classification and the word of known classification, analyzing said application data of the word pair by making a reference to said inter-word pattern, and judging whether said application data of the word pair is data of the identically-classified word pair or data of the differently-classified word pair; and a classification determination section for determining classification of the word of unknown classification of said word pair based upon a judgment result by said inter-word pattern application section.

In additions, the 3rd mode of the present invention, in the above-mentioned mode, is characterized in that said inter-pattern pattern learning section comprises: a learning data creation section for creating, based upon a relation between the identically-classified words co-appearing in the document, learning data that is comprised of at least either the context information or the layout information of an identically classified word pair of known classification, being a set of the above identically classified words of known classification, and based upon a relation between the differently classified words of known classification co-appearing in the document, learning data that is comprised of at least either the context information or the layout information of an identically-classified word pair of known classification, being a set of the above differently-classified words of known classification; and an inter-word pattern creation section for creating the inter-word pattern for judging whether the data of the word pair including the inputted word of unknown classification is data of the identically-classified word pair or data of the differently-classified word pair.

In additions, the 4th mode of the present invention, in the above-mentioned mode, is characterized in that said learning data creation section creates the learning data for each occurrence position of the document in which the identically-classified word pair of known classification or the differently-classified word pair of known classification co-appears.

In additions, the 5th mode of the present invention, in the above-mentioned mode, is characterized in that said learning data creation section creates the learning data for each identically-classified word pair of known classification or for each differently-classified word pair of known classification.

In additions, the 6th mode of the present invention, in the above-mentioned mode, is characterized in that said learning data creation section defines the learning data of the identically-classified word pair of known classification as learning data of a positive example, and the learning data of the differently-classified word pair of known classification as learning data of a negative example.

In additions, the 7th mode of the present invention, in the above-mentioned mode, is characterized in that said learning data creation section defines the learning data of the word pair satisfying a specific condition, out of the learning data of the differently-classified word pairs, as learning data of a negative example.

In additions, the 8th mode of the present invention, in the above-mentioned mode, is characterized in that said specific condition is one of a condition that a co-appearance frequency between the words is higher than a predetermined value, a condition that a co-occurrence probability is higher than a predetermined value, or a condition that a mutual information amount is higher than a predetermined value.

In additions, the 9th mode of the present invention, in the above-mentioned mode, is characterized in that said inter-word pattern application section comprises: an application data creation section for, based upon a relation between said word of unknown classification and the word of known classification co-appearing in the document, creating the application data of the word pair that is comprised of at least either the context information or the layout information of the word pair of said word of unknown classification and said word of known classification; and a pattern application section for analyzing said application data of the word pair by making a reference to said inter-word pattern, and judging whether said application data of the word pair is data of the identically-classified word pair or data of the differently-classified word pair.

In additions, the 10th mode of the present invention, in the above-mentioned mode, is characterized in that said inter-pattern pattern learning section comprises: a learning data creation section for creating, based upon a relation between an identically-classified words co-appearing in the document, learning data that is comprised of at least either the context information or the layout information of the identically-classified word pair of known classification, being a set of the above identically-classified words of known classification, and based upon a relation between a differently-classified words of known classification co-appearing in the document, learning data that is comprised of at least either the context information or the layout information of the differently classified word pair of known classification pair, being a set of the above differently-classified words of known classification; and an inter-word pattern creation section for creating the inter-word pattern for judging whether the data of the word pair including the inputted word of unknown classification is data of the identically-classified word pair or data of the differently-classified word pair based upon said learning data.

In additions, the 11th mode of the present invention, in the above-mentioned mode, is characterized in that said pattern application section outputs whether said application data of the word pair is a positive example or a negative example.

In additions, the 12th mode of the present invention, in the above-mentioned mode, is characterized in that said inter-word pattern creation section is Support Vector Machines.

In additions, the 13th mode of the present invention, in the above-mentioned mode, is characterized in that said pattern application section is Support Vector Machines.

In additions, the 14th mode of the present invention, in the above-mentioned mode, is characterized in that said classification determination section determines the classification of the word of unknown classification based upon a probability that the word pair of the word of unknown classification and the word of known classification is a word pair of the identically-classified words.

The 15th mode of the present invention is characterized in that a word classification system, comprising: an inter-word pattern learning section for creating, based upon context information and layout information between identically-classified words of known classification co-appearing in a document, learning data of a positive example that is comprised of the context information and the layout information of an identically-classified word pair of known classification, being a set of the above identically-classified words of known classification, and based upon context information and layout information between differently-classified words of known classification co-appearing in the document, learning data of a negative example that is comprised of the context information and the layout information of a differently-classified word pair of known classification, being a set of the above differently-classified words of known classification, and creating an inter-word pattern for judging whether the data of the word pair, being a set of an inputted word of unknown classification and the word of known classification, is the positive example or the negative example based upon said learning data, an inter-word pattern storage section in which said created inter-word patterns are stored; an inter-word pattern application section for, based upon a relation between the inputted word of unknown classification and the word of known classification co-appearing in the document, creating application data that is comprised of the context information and the layout information of the word pair, being a set of said word of unknown classification and said word of known classification, analyzing said application data of the word pair by making a reference to said inter-word pattern, and outputting whether said application data of the word pair is the positive example or the negative example; and a classification determination section for determining classification of the word of unknown classification of said word pair based upon the number of the positive examples or the negative examples of the application data said word pair and the classification of the word of known classification of said word pair.

The 16th mode of the present invention is characterized in that a learning data creation apparatus for creating learning data that is employed for determining classification of a word of unknown classification of which the classification is unknown, said learning data creation apparatus comprising a learning data creation section for creating the learning data that is comprised of at least either context information or layout information between words of known classification co-appearing in a document.

The 17th mode of the present invention is characterized in that a word classification method, comprising learning at least either context information or layout information between words of known classification that co-appear, based upon a relation between the words of known classification co-appearing in a document, and employing an inter-word pattern for judging whether data of a word pair, being a set of the words, is data of an identically-classified word pair, being a set of identically-classified words, or is data of a differently-classified word pair, being a set of differently-classified words, for determining classification of a word of unknown classification.

In additions, the 18th mode of the present invention, in the above-mentioned mode, is characterized in that the word classification method comprising: creating, based upon a relation between the inputted word of unknown classification and the word of known classification co-appearing in the document, learning data of the word pair, being a set of said word of unknown classification and said word of known classification, said learning data comprised of at least either the context information or the layout information between said word of unknown classification and the word of known classification; analyzing said application data of the word pair by making a reference to said inter-word pattern; judging whether said application data of the word pair is data of the identically-classified word pair or data of the differently-classified word pair; and determining the classification of said word of unknown classification based upon said judgment result.

In additions, the 19th mode of the present invention, in the above-mentioned mode, is characterized in that the word classification method comprising: creating, based upon a relation between the identically-classified words co-appearing in the document, learning data that is comprised of at least either the context information or the layout information of an identically-classified word pair of known classification, being a set of the above identically-classified words of known classification, and based upon a relation between the differently-classified words of known classification co-appearing in the document, learning data that is comprised of at least either the context information or the layout information of a differently-classified word pair of known classification, being a set of the above differently-classified words of known classification; and creating an inter-word pattern for judging whether the data of the word pair including the inputted word of unknown classification is data of the identically-classified word pair or data of the differently-classified word pair based upon said learning data.

In additions, the 20th mode of the present invention, in the above-mentioned mode, is characterized in that the word classification method comprising creating the learning data for each occurrence position of the document in which the identically-classified word pair of known classification or the differently-classified word pair of known classification co-appears.

In additions, the 21st mode of the present invention, in the above-mentioned mode, is characterized in that the word classification method comprising creating the learning data for each identically-classified word pair of known classification or for each differently-classified word pair of known classification.

In additions, the 22nd mode of the present invention, in the above-mentioned mode, is characterized in that the word classification method comprising creating the learning data of the identically-classified word pair of known classification as learning data of a positive example, and creating the learning data of the differently-classified word pair of known classification as the learning data of a negative example.

In additions, the 23rd mode of the present invention, in the above-mentioned mode, is characterized in that the word classification method comprising defining the learning data of the word pair satisfying a specific condition, out of the learning data of the differently-classified word pairs, as the learning data of the negative example.

In additions, the 24th mode of the present invention, in the above-mentioned mode, is characterized in that said specific condition is one of a condition that a co-appearance frequency between the words is higher than a predetermined value, a condition that a co-occurrence probability is higher than a predetermined value, or a condition that a mutual information amount is higher than a predetermined value.

In additions, the 25th mode of the present invention, in the above-mentioned mode, is characterized in that the word classification method comprising: based upon a relation between said word of unknown classification and the word of known classification co-appearing in the document, creating the learning data that is comprised of at least either the context information or the layout information of the word pair, being a set of said word of unknown classification and said word of known classification; analyzing said application data of the word pair by making a reference to said inter-word pattern; and judging whether said application data of the word pair is data of the identically-classified word pair or data of the differently-classified word pair.

In additions, the 26th mode of the present invention, in the above-mentioned mode, is characterized in that the word classification method comprising: creating, based upon a relation between the identically-classified words co-appearing in the document, learning data that is comprised of at least either the context information or the layout information of an identically-classified word pair of known classification, being a set of the above identically-classified words of known classification, and based upon a relation between the differently-classified words co-appearing in the document, learning data that is comprised of at least either the context information or the layout information of an differently-classified word pair of known classification, being a set of the above differently-classified words of known classification; and creating the inter-word pattern for judging whether the data of the word pair including the inputted word of unknown classification is data of the identically-classified word pair or data of the differently-classified word pair based upon said learning data.

In additions, the 27th mode of the present invention, in the above-mentioned mode, is characterized in that the word classification method comprising analyzing said application data, and outputting whether said application data of the word pair is the positive example or the negative example.

In additions, the 28th mode of the present invention, in the above-mentioned mode, is characterized in that the word classification method comprising determining the classification of the word of unknown classification based upon a probability that the word pair of the word of unknown classification and the word of known classification is a word pair of the identically-classified words.

The 29th mode of the present invention is characterized in that a word classification method, comprising: creating, based upon context information and layout information between identically-classified words of known classification co-appearing in a document, learning data of a positive example that is comprised of the context information and the layout information of an identically-classified word pair of known classification, being a set of the above identically-classified words of known classification, and based upon context information and layout information between differently-classified words of known classification co-appearing in the document, learning data of a negative example that is comprised of the context information and the layout information of a differently-classified word pair of known classification, being a set of the above differently-classified words of known classification; creating an inter-word pattern for judging whether the data of the word pair, being a set of an inputted word of unknown classification and the word of known classification, is a positive example or a negative example based upon said learning data; based upon a relation between the word of unknown classification and the word of known classification co-appearing in the document, creating application data that is comprised of the context information and the layout information of the word pair, being a set of said word of unknown classification and said word of known classification, analyzing said application data of the word pair by making a reference to said inter-word pattern, and judging whether said application data of the word pair is the positive example or the negative example; and determining classification of the word of unknown classification of said word pair based upon the number of the positive examples or the negative examples of said application data of the word pair and the classification of the word of known classification of said word pair.

The 30th mode of the present invention is characterized in that a learning data creation method of creating learning data that is employed for determining classification of a word of unknown classification of which the classification is unknown, comprising creating the learning data that is comprised of at least either context information or layout information between words of known classification co-appearing in a document.

The 31st mode of the present invention is characterized in that a program for causing an information processing apparatus to execute an inter-word pattern learning process of learning at least either context information or layout information between words of known classification that co-appear based upon a relation between words of known classification co-appearing in a document, and creating an inter-word pattern for judging whether data of a word pair, being a set of the words, is data of an identically-classified word pair, being a set of the identically-classified words, or is data of a differently-classified word pair, being a set of the differently-classified words.

The 32nd mode of the present invention is characterized in that a program for causing an information processing apparatus to execute the processes of: creating, based upon context information and layout information between identically-classified words of known classification co-appearing in a document, learning data of a positive example that is comprised of the context information and the layout information of an identically-classified word pair of known classification, being a set of the above identically-classified words of known classification, and based upon context information and layout information between differently-classified words of known classification co-appearing in the document, learning data of a negative example that is comprised of the context information and the layout information of an differently-classified word pair of known classification, being a set of the above differently-classified words of known classification; and creating an inter-word pattern for judging whether the data of the word pair, being a set of an inputted word of unknown classification and the word of known classification, is the positive example or the negative example based upon said learning data; based upon a relation between the word of unknown classification and the word of known classification co-appearing in the document, creating application data that is comprised of the context information and the layout information of the word pair, being a set of said word of unknown classification and said word of known classification; analyzing said application data of the word pair by making a reference to said inter-word pattern, and judging whether said application data of the word pair is the positive example or the negative example; and determining classification of the word of unknown classification of said word pair based upon the number of the positive examples or the negative examples of said application data of the word pair, and the classification of the word of known classification of said word pair.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the sprit and scope of the invention.

APPLICABILITY IN INDUSTRY

The present invention may be applied to the automatic classification of the dictionary that becomes a basis for the morphological analysis tool etc. Further, the present invention may be applied to a field as well such as retrieval navigation by presenting the words of identical kind in the retrieval system.

The invention claimed is:

1. A word classification system, comprising an inter-word pattern learning section that, based upon a relation between words of known classification co-appearing in a document, learns at least either context information or layout information between the words of known classification that co-appear, and creates an inter-word pattern for judging whether data of a word pair, being a set of the words, is data of an identically-classified word pair, being a set of identically-classified words, or data of a differently-classified word pair, being a set of differently-classified words.

2. A word classification system according to claim 1, comprising:
an inter-word pattern application section that, based upon a relation between an inputted word of unknown classification and the word of known classification co-appearing in the document, creates application data of the word pair, being a set of said word of unknown classification and said word of known classification, said application data comprised of at least either the context information or the layout information between said word of unknown classification and the word of known classification, analyzes said application data of the word pair by making a reference to said inter-word pattern, and judges whether said application data of the word pair is data of the identically-classified word pair or data of the differently-classified word pair; and
a classification determination section that determines classification of the word of unknown classification of said word pair based upon a judgment result by said inter-word pattern application section.

3. A word classification system according to claim 1, wherein said inter-pattern pattern learning section comprises:
a learning data creation section that creates, based upon a relation between the identically-classified words co-appearing in the document, learning data that is comprised of at least either the context information or the layout information of an identically classified word pair of known classification, being a set of said identically classified words of known classification, and based upon a relation between the differently classified words of known classification co-appearing in the document, learning data that is comprised of at least either the context information or the layout information of an identically-classified word pair of known classification, being a set of said differently-classified words of known classification; and
an inter-word pattern creation section that creates the inter-word pattern for judging whether the data of the word pair including the inputted word of unknown classification is data of the identically-classified word pair or data of the differently-classified word pair.

4. A word classification system according to claim 3, wherein said learning data creation section creates the learning data for each occurrence position of the document in which the identically-classified word pair of known classification or the differently-classified word pair of known classification co-appears.

5. A word classification system according to claim 3, wherein said learning data creation section creates the learning data for each identically-classified word pair of known classification or for each differently-classified word pair of known classification.

6. A word classification system according to claim 3, wherein said learning data creation section defines the learning data of the identically-classified word pair of known classification as learning data of a positive example, and the learning data of the differently-classified word pair of known classification as learning data of a negative example.

7. A word classification system according to claim 6, wherein said learning data creation section defines the learning data of the word pair satisfying a specific condition, out of the learning data of the differently-classified word pairs, as learning data of a negative example.

8. A word classification system according to claim 7, wherein said specific condition is one of a condition that a co-appearance frequency between the words is higher than a predetermined value, a condition that a co-occurrence probability is higher than a predetermined value, or a condition that a mutual information amount is higher than a predetermined value.

9. A word classification system according to claim 2, wherein said inter-word pattern application section comprises:
an application data creation section that, based upon a relation between said word of unknown classification and the word of known classification co-appearing in the document, creates the application data of the word pair that is comprised of at least either the context information or the layout information of the word pair of said word of unknown classification and said word of known classification; and
a pattern application section that analyzes said application data of the word pair by making a reference to said inter-word pattern, and judges whether said application data of the word pair is data of the identically-classified word pair or data of the differently-classified word pair.

10. A word classification system according to claim 9, wherein said inter-pattern pattern learning section comprises:
a learning data creation section that creates, based upon a relation between an identically-classified words co-appearing in the document, learning data that is comprised of at least either the context information or the layout information of the identically-classified word pair of known classification, being a set of said identically-classified words of known classification, and based upon a relation between a differently-classified words of known classification co-appearing in the document, learning data that is comprised of at least either the context information or the layout information of the differently classified word pair of known classification pair, being a set of said differently-classified words of known classification; and
an inter-word pattern creation section that creates the inter-word pattern for judging whether the data of the word pair including the inputted word of unknown classification is data of the identically-classified word pair or data of the differently-classified word pair based upon said learning data.

11. A word classification system according to claim 9, wherein said pattern application section outputs whether said application data of the word pair is a positive example or a negative example.

12. A word classification system according to claim 3, wherein said inter-word pattern creation section is Support Vector Machines.

13. A word classification system according to claim 9, wherein said pattern application section is Support Vector Machines.

14. A word classification system according to claim 2, wherein said classification determination section determines the classification of the word of unknown classification based upon a probability that the word pair of the word of unknown classification and the word of known classification is a word pair of the identically-classified words.

15. A word classification system, comprising:
an inter-word pattern learning section that creates, based upon context information and layout information between identically-classified words of known classification co-appearing in a document, learning data of a positive example that is comprised of the context information and the layout information of an identically-classified word pair of known classification, being a set of said identically-classified words of known classification, and based upon context information and layout information between differently-classified words of known classification co-appearing in the document, learning data of a negative example that is comprised of the context information and the layout information of a differently-classified word pair of known classification, being a set of said differently-classified words of known classification, and creating an inter-word pattern for judging whether the data of the word pair, being a set of an inputted word of unknown classification and the word of known classification, is the positive example or the negative example based upon said learning data,
an inter-word pattern storage in which said created inter-word patterns are stored;
an inter-word pattern application section that, based upon a relation between the inputted word of unknown classification and the word of known classification co-appearing in the document, creates application data that is comprised of the context information and the layout information of the word pair, being a set of said word of unknown classification and said word of known classification, analyzes said application data of the word pair by making a reference to said inter-word pattern, and outputs whether said application data of the word pair is the positive example or the negative example; and
a classification determination section that determines classification of the word of unknown classification of said word pair based upon the number of the positive examples or the negative examples of the application data said word pair and the classification of the word of known classification of said word pair.

16. A word classification method, comprising:
Learning, by a processor, at least either context information or layout information between words of known classification that co-appear, based upon a relation between the words of known classification co-appearing in a document, and employing an inter-word pattern for judging whether data of a word pair, being a set of the words, is data of an identically-classified word pair, being a set of identically-classified words, or is data of a differently-classified word pair, being a set of differently-classified words, for determining classification of a word of unknown classification.

17. A word classification method according to claim 16, comprising:
creating, by the processor, based upon a relation between the inputted word of unknown classification and the word of known classification co-appearing in the document, learning data of the word pair, being a set of said word of unknown classification and said word of known classification, said learning data comprised of at least either the context information or the layout information between said word of unknown classification and the word of known classification;
analyzing, by the processor, said application data of the word pair by making a reference to said inter-word pattern;
judging, by the processor, whether said application data of the word pair is data of the identically-classified word pair or data of the differently-classified word pair; and
determining, by the processor, the classification of said word of unknown classification based upon said judgment result.

18. A word classification method according to claim 16, comprising:
creating, by the processor, based upon a relation between the identically-classified words co-appearing in the document, learning data that is comprised of at least either the context information or the layout information of an identically-classified word pair of known classification, being a set of said identically-classified words of known classification, and based upon a relation between the differently-classified words of known classification co-appearing in the document, learning data that is comprised of at least either the context information or the layout information of a differently-classified word pair of known classification, being a set of said differently-classified words of known classification; and
creating, by the processor, an inter-word pattern for judging whether the data of the word pair including the inputted word of unknown classification is data of the identically-classified word pair or data of the differently-classified word pair based upon said learning data.

19. A word classification method according to claim 18, comprising creating, by the processor, the learning data for each occurrence position of the document in which the identically-classified word pair of known classification or the differently-classified word pair of known classification co-appears.

20. A word classification method according to claim 18, comprising creating, by the processor, the learning data for each identically-classified word pair of known classification or for each differently-classified word pair of known classification.

21. A word classification method according to claim 18, comprising creating, by the processor, the learning data of the identically-classified word pair of known classification as learning data of a positive example, and creating, by the processor, the learning data of the differently-classified word pair of known classification as the learning data of a negative example.

22. A word classification method according to claim 21, comprising defining, by the processor, the learning data of the word pair satisfying a specific condition, out of the learning data of the differently-classified word pairs, as the learning data of the negative example.

23. A word classification method according to claim 22, wherein said specific condition is one of a condition that a co-appearance frequency between the words is higher than a predetermined value, a condition that a co-occurrence probability is higher than a predetermined value, or a condition that a mutual information amount is higher than a predetermined value.

24. A word classification method according to claim 17, comprising:
based upon a relation between said word of unknown classification and the word of known classification co-appearing in the document, creating, by the processor, the learning data that is comprised of at least either the context information or the layout information of the word pair, being a set of said word of unknown classification and said word of known classification;
analyzing, by the processor, said application data of the word pair by making a reference to said inter-word pattern; and
judging, by the processor, whether said application data of the word pair is data of the identically-classified word pair or data of the differently-classified word pair.

25. A word classification method according to claim 24, comprising:
creating, by the processor, based upon a relation between the identically-classified words co-appearing in the document, learning data that is comprised of at least either the context information or the layout information of an identically-classified word pair of known classification, being a set of said identically-classified words of known classification, and based upon a relation between the differently-classified words co-appearing in the document, learning data that is comprised of at least either the context information or the layout information of an differently-classified word pair of known classification, being a set of said differently-classified words of known classification; and
creating, by the processor, the inter-word pattern for judging whether the data of the word pair including the inputted word of unknown classification is data of the identically-classified word pair or data of the differently-classified word pair based upon said learning data.

26. A word classification method according to claim 24, comprising analyzing, by the processor, said application data, and outputting whether said application data of the word pair is the positive example or the negative example.

27. A word classification method according to claim 17, comprising determining, by the processor, the classification of the word of unknown classification based upon a probability that the word pair of the word of unknown classification and the word of known classification is a word pair of the identically-classified words.

28. A word classification method, comprising:
creating, by the processor, based upon context information and layout information between identically-classified words of known classification co-appearing in a document, learning data of a positive example that is comprised of the context information and the layout information of an identically-classified word pair of known classification, being a set of said identically-classified words of known classification, and based upon context information and layout information between differently-classified words of known classification co-appearing in the document, learning data of a negative example that is comprised of the context information and the layout information of a differently-classified word pair of known classification, being a set of said differently-classified words of known classification;
creating, by the processor, an inter-word pattern for judging whether the data of the word pair, being a set of an inputted word of unknown classification and the word of known classification, is a positive example or a negative example based upon said learning data;
based upon a relation between the word of unknown classification and the word of known classification co-appearing in the document, creating, by the processor, application data that is comprised of the context information and the layout information of the word pair, being a set of said word of unknown classification and said word of known classification, analyzing said application data of the word pair by making a reference to said inter-word pattern, and judging whether said application data of the word pair is the positive example or the negative example; and
determining, by the processor, classification of the word of unknown classification of said word pair based upon the number of the positive examples or the negative examples of said application data of the word pair and the classification of the word of known classification of said word pair.

29. A non-transitory computer readable storage medium storing a program for causing an information processing apparatus to execute an inter-word pattern learning process of learning at least either context information or layout information between words of known classification that co-appear based upon a relation between words of known classification co-appearing in a document, and creating an inter-word pattern for judging whether data of a word pair, being a set of the words, is data of an identically-classified word pair, being a set of the identically-classified words, or is data of a differently-classified word pair, being a set of the differently-classified words.

30. A non-transitory computer readable storage medium storing a program for causing an information processing apparatus to execute the processes of:
creating, based upon context information and layout information between identically-classified words of known classification co-appearing in a document, learning data of a positive example that is comprised of the context information and the layout information of an identically-classified word pair of known classification, being a set of said identically-classified words of known classification, and based upon context information and layout information between differently-classified words of known classification co-appearing in the document, learning data of a negative example that is comprised of the context information and the layout information of an differently-classified word pair of known classification, being a set of said differently-classified words of known classification; and
creating an inter-word pattern for judging whether the data of the word pair, being a set of an inputted word of unknown classification and the word of known classification, is the positive example or the negative example based upon said learning data;
based upon a relation between the word of unknown classification and the word of known classification co-appearing in the document, creating application data that is comprised of the context information and the layout information of the word pair, being a set of said word of unknown classification and said word of known classification;
analyzing said application data of the word pair by making a reference to said inter-word pattern, and judging whether said application data of the word pair is the positive example or the negative example; and determining classification of the word of unknown classification of said word pair based upon the number of the positive examples or the negative examples of said application data of the word pair, and the classification of the word of known classification of said word pair.

* * * * *